United States Patent Office 3,092,165
Patented June 4, 1963

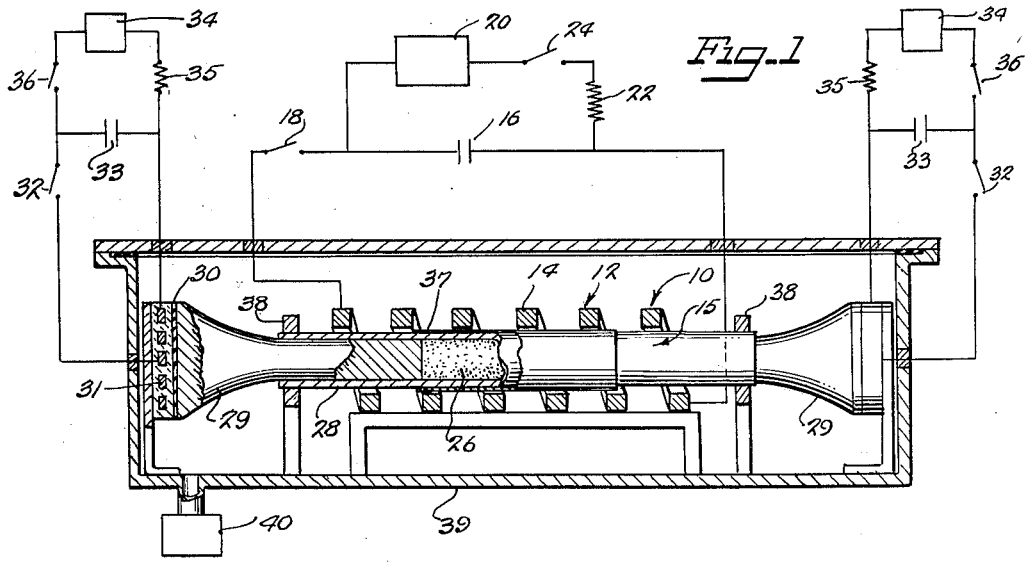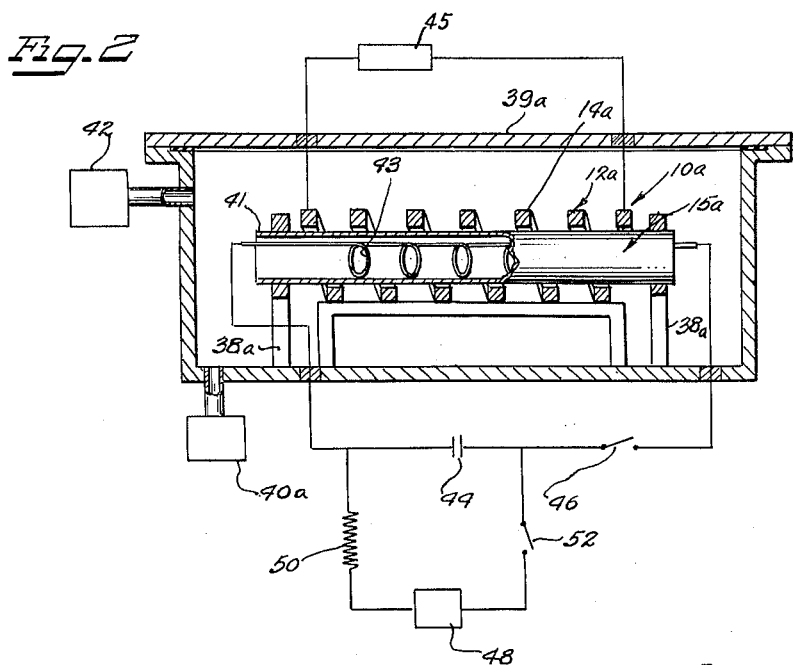

3,092,165
MAGNETIC FORMING METHOD AND
APPARATUS THEREFOR
George W. Harvey, San Diego (La Jolla), Calif., assignor to General Dynamics Corporation, New York, N.Y., a corporation of Delaware
Filed Jan. 11, 1961, Ser. No. 82,070
10 Claims. (Cl. 153—2)

The present invention relates to a method and an apparatus for forming and, more particularly, to a method and an apparatus for forming material by employing a varying magnetic field.

In a co-pending application, Serial No. 757,867, which was filed on August 28, 1958, now Patent No. 2,976,907, and is assigned to the assignee of the present invention, a method and a apparatus are set forth for forming metal by employing a magnetic field of high flux density. In the described device, a magnetic field of high flux density is set up about a shaped conductor by passing a current pulse of high amperage through the conductor. The high-intensity field induces a current in a metal work piece disposed in the magnetic field. The interaction between the high-intensity magnetic field and the magnetic field produced by the induced current in the work piece produces an impulse on the work piece which, when made great enough, forms the metal work piece.

An object of the present invention is the provision of an additional method and an apparatus for forming by employing the energy of a high-intensity magnetic field. Another object is the provision of a method and an apparatus for forming which is especially adapted to form a metal work piece of a low electrical conductivity or a work piece of non-metallic material. A further object is the provision of a method of forming a work piece wherein the force applied to the work piece may be controlled. Still a further object is the provision of a forming method which is relatively efficient and economical to employ.

Other objects and advantages of the present invention will become apparent by reference to the following description and accompanying drawings.

In the drawings:

FIGURE 1 is a schematic cross sectional view of a magnetic forming device which may be employed to practice a forming method in accordance with the present invention; and FIGURE 2 is a schematic cross sectional view of another embodiment of an apparatus which may be employed to practice a forming method in accordance with the present invention.

In accordance with the present invention, the forming method generally comprises setting up in a work space a varying magnetic field of predetermined intensity and shape. A work piece to be formed is maintained at a predetermined position within the work space. A plasma of predominantly or partially ionized material (comparable to that in an atomic hydrogen arc or metallic welding arc) is provided at the portion of the work piece to be formed, the plasma being accelerated by the magnetic field sufficiently to transfer energy to the portion of the work piece to form the work piece in the desired manner.

For purposes of explanation the method is described hereinafter in connection with apparatus which may be employed to practice the method. Specifically, the apparatus shown in FIGURE 1 includes a means 10 for setting up a varying magnetic field of very high-intensity. The illustrated means includes a coil or solenoid 12 which is formed by a conductive member 14. The number of turns of the member 14 depends upon the desired flux density of the magnetic field within the core or work space 15 and the amount of energy stored in a source 16 of energy such as a capacitor bank or a motor generator, which is connected to the coil. Switch means 18, such an ignitron, thyratron, etc., is connected between the coil and the source 16 of energy.

The coil 12 is made of sufficient strength to withstand radial pressure which is produced by the expansion of the high-intensity magnetic field set up within the core 15 of the coil 12. To provide this strength a backing (not shown) may be provided for the coil 12 and/or the coil member 14 may be made of a sufficiently large cross sectional area to withstand the pressure. The expansion of the high-intensity field also heats conductive material in its path to a high temperature, and hence the coil 12 is preferably made of high temperature material, such as molybdenum.

The capacitor bank 16 is charge to a predetermined voltage by a high voltage source 20 connected across the capacitor bank 16. A current limiting resistor 22 and a switch 24 are connected in series with the voltage source 20. When using certain power supplies, the current limiting resistor may be eliminated.

The apparatus shown in FIGURE 1 may be employed to compress material 26 in granular form, such as granular metal oxide. The material 26 is initially pressed into a tubular member or sleeve 28 of metallic or non-metallic material, which serves as the work piece. Suitable inertial end plugs 29 of relatively heavy material such as steel or tungsten carbide are provided in the ends of the sleeve 28. In the illustrated embodiment, the end plugs 29 are each forced inwardly by the interaction of an additional magnetic field on a coating 30 of conductive material, such as molybdenum, on the flat outer end of the end plug 29. The exponential shape of the end plugs 29 provides an efficient means of transmitting the pressure wave.

The field is established by a flat, spirally wrapped coil 31 of conductive material which is embedded in insulating material and is suitably supported in parallel relation to the coating 30. The coil 31 is connected through switch means 32 such as an ignitron, thyratron, etc., to an energy storage means 33, such as a capacitor bank. Energy is stored in the capacitor bank 33 by connecting a high voltage source 34 thereto. A current limiting resistor 35 and a switch means 36 are connected in series with the source 34. The current limiting resistor may be eliminated with certain power supplies.

Prior to the forming operation, the coils 31 may be excited a few times to heat the granular material 26 or other material in contact with the inner end of the plugs 29 by sonic or ultrasonic absorption.

A very thin film 37 of conductive material, such as copper, silver, etc., the purpose of which is explained hereinafter, is deposited on the outer surface of the sleeve by a suitable process, such as electroplating. The sleeve 28 is disposed in the core 15 of the coil 12 in coaxial relationship therewith. The sleeve 28 is maintained in position by suitable clamps 38.

When the very high-intensity magnetic field is set up within the core of the coil 12, the magnetic field intersects the thin film 37 of conductive material on the sleeve 28 and induces a very high current therein. Because of the high current flowing through the small cross sectional area of the film 37, the film is heated in a very short time to a point where it is completely or partially vaporized. The metal vapor, in turn, is ionized by the high-intensity field thereby providing a layer of ionized material or a plasma at the surface of the sleeve 28. The high-intensity field rapidly accelerates the plasma toward the sleeve 28 with a high force. When the plasma impinges upon the sleeve 28, it applies a mechanical force to the surface of the sleeve 28 and thereby reduces the diameter of the sleeve 28 and compresses the material therein.

In the embodiment illustrated in FIGURE 1, the component parts of the forming apparatus are disposed in a gas tight chamber 39 which is suitably evacuated by a pump 40. The absence of air pressure at the surface of the sleeve 28 precludes the forming operation from being affected by adverse air pressure. However, in certain applications it may be desirable to form a metal work piece in an atmosphere of a specific composition and pressure.

The plasma is at a relatively high temperature when it strikes the sleeve 28, and hence a certain amount of heat is transferred to the sleeve 28. The amount of heat transferred depends upon the temperature of the plasma and the length of time that the plasma acts upon the sleeve. For a given intensity of field, the temperature of the plasma is increased by decreasing the thickness of the film, that is, decreasing the mass of the film. However, the amount of force on the sleeve for a given field decreases as the thickness of the film is decreased. The length of time that the plasma acts on the sleeve depends upon the duration of the pulse of current supplied to the coil. Thus, the maximum flux density, the duration of the pulse, and the thickness of the film are governed by the allowable temperature rise of the sleeve.

For maximum efficiency, the energy stored in the source 16, and the inductance and resistance of the coil 12 are such that the desired magnetic field is set up in a time short compared with the decay time of the discharge. Preferably the desired magnetic field is set up in less than about 20 microseconds for work pieces with thin sections, but with longer times for work pieces with thicker sections.

In operation the capacitor bank 16 is charged by closing the switch 24 to the high voltage supply 20. After the capacitor bank 16 is charged the switch 24 is opened, and the switch means 18 is closed, whereby a high amperage current flows through the coil 12. A high-intensity field is set up around the coil 12 and this field intersects the film 37 on the sleeve 28 and induces a current therein. The induced current flowing through the film 37 heats the film, and vaporizes the same. The resulting vapor is then ionized by the magnetic field. The ionized vapor or plasma reacts with the magnetic field and is forced toward the sleeve 28 and thereby exerts a mechanical force on the surface of the sleeve. The sleeve is thus reduced in diameter and the material contained therein is compressed.

The pressure exerted by the plasma may be increased by mixing unvaporized particles of a suitable material, such as metal particles, with the plasma. The particles may be added to the chamber 38 prior to the ionization of the vaporized film, but may also be produced incidental to vaporization of the film 30.

In one illustrated embodiment the coil includes 5 turns of a molybdenum conductor. The core of the coil is approximately 2½ inches long and 2 inches in diameter. The coil is connected to a 1200 microfarad capacitor bank, which is charged to 14 kilovolts.

The coil is disposed within a chamber and a stainless steel sleeve containing granular metal oxide is disposed within the core of the coil. The chamber is sealed and then evacuated to .01 mm. Hg. The thickness of the tube is approximately .06 inch and the external diameter of the tube is 1 and 15/16 inches. A .0005 inch copper film is electroplated on the sleeve prior to its insertion into the core. The switch means to the capacitor bank is closed and a current pulse of approximately $10^6$ amperes and approximately 200 microseconds in duration is passed through the coil thereby providing a magnetic field at the surface of the sleeve of approximately $10^6$ gauss. This field heats the copper film to approximately 3000 degrees C., thereby vaporizing the film. The resulting copper vapor is ionized by the field, and the field reacts with the ionized vapor to force the plasma against the sleeve with a force of approximately $10^6$ pounds per square inch.

In the embodiment shown in FIGURE 2, wherein similar parts to those shown in FIGURE 1 are indicated by the same reference numeral with the subscript "a," means are provided for controlling the force applied to a metallic work piece.

In the embodiment shown in FIGURE 2, the plasma is provided at the surface of a tubular metallic work piece 41 by pre-ionizing a gas contained within the chamber 39a. The gas, which may be deuterium, mercury vapor, sodium vapor, etc., is supplied by a source 42 at a pressure such that the gas is easily ionized. The gas is pre-ionized prior to the setting up of the high-intensity field by suitable means, such as a preliminary discharge of an auxiliary capacitor bank 45 through the coil. The preionization may also be provided by radio-frequency waves, light rays, etc.

The force applied to the work piece 41 is controlled by providing a controlled amount of current in the work piece 41, the current establishing a magnetic field around the work piece 41. As shown in FIGURE 2, a current is included in the work piece 41 by an auxiliary coil 43, disposed axially within the tubular work piece 41. A predetermined amount of current is passed through the auxiliary coil 43 by an energy storage means or storage capacitor 44 through a switch means 46 to the auxiliary coil 43. The current may also be induced in the work piece by an auxiliary coil disposed in adjacent relationship to the outside surface of the work piece.

Energy is stored in the capacitor 44 by connecting a high voltage source 48 thereto. A current limiting resistor 50 and a switch means 52 are connected in series with the source 48. The current limiting resistor 50 may be eliminated with certain power supplies.

As previously explained, the high intensity field set up by the coil 12a rapidly accelerates the plasma toward the work piece 41. The movement of the plasma relative to the magnetic field established around the work piece 41 produces a pressure on the work piece. The amount of force or pressure on the work piece is controlled by adjusting the energy stored in the capacitor 44 and the switching time of the switch means 46 to thereby vary the current passing through the auxiliary coil 43, with respect to time and magnitude, relative to the current in the coil 12.

From the above it can be seen that the present invention provides a method and apparatus for forming a work piece of metallic or non-metallic material. Forming may include shaping, welding, embossing, engraving, etc. Also, the method may be employed to remove a conductive metal from an underlying low conductivity body of material.

The work pieces formed by the method or apparatus may be flat plates, irregularly shaped tubes, or other suitable shaped work pieces. The shape of the work coil is selected to provide the intensity and shape of the field necessary to form the work piece in the desired manner. For example, the coil may be a one turn coil, a multiturn coil, a hairpin shaped coil, a spirally shaped coil, etc. Suitable dies may be provided to aid in the forming of the workpiece and the work piece may be expanded rather than compressed.

Various other changes and modifications may be made in the above described method and apparatus for forming without deviating from the spirit or scope of the present invention.

Various features of the invention are set forth in the accompanying claims.

What is claimed is:

1. A method of forming, comprising disposing a substance to be formed in a controlled pressure zone, introducing a gas that is easily ionizable into said zone, preionizing said gas adjacent said substance, and establishing a varying magnetic field at the ionized gas, said field being of sufficient intensity and of such a shape as to react with the ionized gas to produce sufficient pressure against certain portions of the substance to form the substance in the desired manner.

2. A method of forming a metal work piece, comprising disposing the metal work piece to be formed in a controlled pressure zone, introducing a gas that is easily ionizable into said zone, pre-ionizing said gas adjacent said work piece, establishing an additional magnetic field around said work piece, and establishing a varying magnetic field at the ionized gas of predetermined intensity and shape, thereby accelerating the same toward the work piece, the interaction between the moving ionized gas and the additional magnetic field producing sufficient pressure on the work piece to form the work piece in the desired manner.

3. A magnetic forming device comprising means for establishing a high-intensity varying magnetic field, means for maintaining a substance to be formed at a predetermined position within the magnetic field, and means for providing a plasma at the surface of the substance to be formed and within the magnetic field, which plasma interacts with the magnetic field so as to produce sufficient pressure on the substance to form the same in the desired manner.

4. A magnetic forming device comprising means defining a controlled pressure zone, a source of energy, means disposed in said defining means for establishing a magnetic field, means for selectively connecting said source of energy to said field establishing means, means for maintaining a substance to be formed in said field, and means for providing a plasma at the surface of the substance to be formed, prior to the establishment of the field, whereby the magnetic field interacts with the plasma to produce a suitable pressure on the substance so as to form the same in the desired manner.

5. A magnetic forming device comprising means defining a controlled pressure zone, a capacitor bank, means in said zone for establishing a magnetic field, means for selectively connecting said capacitor bank to said field establishing means, means for maintaining a substance to be formed in said magnetic field, means in communication with said defining means for providing an ionizable gas at said substance, and means for pre-ionizing the gas adjacent the surface of said substance, whereby the magnetic field reacts with the pre-ionized gas to produce sufficient pressure against certain portions of the substance to form the same in the desired manner.

6. A magnetic forming device comprising means defining a controlled pressure zone, means for establishing a first magnetic field in said pressure zone, a source of energy, means for selectively connecting said source of energy to said field establishing means, means for maintaining a substance to be formed in the first magnetic field, means for establishing a controllable second magnetic field around the substance, and means for providing an ionized gas at the surface of the substance to be formed, whereby the first magnetic field reacts with the ionized gas thereby accelerating the same toward the substance, the interaction between the moving ionized gas and the second magnetic field producing sufficient pressure on the substance to form the same in the desired manner.

7. A method of forming a work piece, which method comprises positioning a work piece to be formed in a predetermined relation to a source of a magnetomotive force, providing a plasma of ionized material at the surface of the work piece, and producing a varying magnetic field at said source which is directed at said plasma and the surface of said work piece so that said magnetic field interacts with said plasma to force said plasma against said work piece, said field being made of such a configuration and intensity that the plasma acts upon the work piece to form the same in a desired manner.

8. A method of forming a work piece, which method comprises coating a work piece to be formed with a thin film of conductive material, positioning the work piece in a predetermined relation to a source of magnetomotive force, and producing a varying magnetic field at said source which is directed at said material and the surface of the work piece so that said material is vaporized and ionized and the magnetic field interacts with the resulting plasma to force said plasma against said work piece, said field being made of such a configuration and intensity that the plasma acts upon the work piece to form the same in a desired manner.

9. A method of forming a work piece, which method comprises positioning a work piece to be formed in a controlled pressure zone, providing a plasma of ionized material adjacent certain portions of the work piece, and establishing a varying magnetic field which is directed at said plasma and the surface of the work piece so that said magnetic field interacts with said plasma to force said plasma against said work piece, said field being made of such a configuration and intensity that the plasma acts upon the work piece to form the same in a desired manner.

10. A method of forming a work piece, which method comprises coating a work piece to be formed with a thin film of conductive material, positioning said work piece in an evacuated zone, and establishing a varying magnetic field at the film of such an intensity and configuration that the thin film is vaporized and ionized and the field reacts with the ionized vapor to produce a pressure on the substance to be formed in a desired manner.

References Cited in the file of this patent
UNITED STATES PATENTS
2,976,907    Harvey et al. _____ Mar. 28, 1961